(12) United States Patent  (10) Patent No.: US 7,529,648 B2
Baum et al.  (45) Date of Patent: May 5, 2009

(54) METHOD, SYSTEM AND COMPUTER PROGRAM PRODUCT FOR AUTOMATICALLY GENERATING A SUBSET OF TASK-BASED COMPONENTS FROM ENGINEERING AND MAINTENANCE DATA

(75) Inventors: Lawrence S. Baum, Bellevue, WA (US);
John H. Boose, Bellevue, WA (US);
Molly L. Boose, Bellevue, WA (US);
Carey S. Chaplin, Seattle, WA (US);
Ole B. Larsen, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1019 days.

(21) Appl. No.: 10/720,714

(22) Filed: Nov. 24, 2003

(65) Prior Publication Data

US 2005/0114096 A1  May 26, 2005

(51) Int. Cl.
*G06F 17/50* (2006.01)
*G06F 19/00* (2006.01)

(52) U.S. Cl. .............................. 703/1; 700/97; 700/104

(58) Field of Classification Search .................... 703/1, 703/2; 700/96, 97, 98, 99, 104, 106, 182; 382/113

See application file for complete search history.

(56) References Cited

U.S. PATENT DOCUMENTS

| | | | |
|---|---|---|---|
| 5,386,508 A | 1/1995 | Itonori et al. | |
| 5,623,679 A | 4/1997 | Rivette et al. | |
| 5,761,328 A | 6/1998 | Solberg et al. | |
| 5,867,596 A | 2/1999 | Kano et al. | |
| 5,895,473 A | 4/1999 | Williard et al. | |
| 6,134,338 A | 10/2000 | Solberg et al. | |
| 7,065,476 B2 * | 6/2006 | Dessureault et al. | 703/2 |
| 2002/0191848 A1 | 12/2002 | Baum et al. | |
| 2002/0194190 A1 | 12/2002 | Shema et al. | |
| 2003/0025734 A1 | 2/2003 | Baum et al. | |

OTHER PUBLICATIONS

Larry S. Baum, John H. Boose, Randy J. Kelly, "Graphics Recognition for a Large-Scale Airplane Information System" Lecture Notes in Computer Science, Graphics Recognition, Algorithoms and Systems, Second International Worshop, GREC'97, Aug. 22-23, 1997, pp. 291-301.*

Larry Baum, John Boose, Molly Boose, Mike Post, Ken Spietz, Brian Johnson, Dave Shema, Susan Chew, Ed Hall. "Interpretation of Technical Illustrations for Airplane Maintenance and Operations, Applications", The Boeing Co. Jul. 13, 1999, 4 pages.*

* cited by examiner

*Primary Examiner*—Paul L Rodriguez
*Assistant Examiner*—Dwin M Craig
(74) *Attorney, Agent, or Firm*—Alston & Bird LLP

(57) ABSTRACT

The method, system and computer program product for automatically generating a subset of components include receiving a request to generate a subset of components, accessing connectivity data that includes information regarding at least the components and connections among the components, and automatically selecting portions of the connectivity data that satisfy the request to generate the subset of components. The subset may then be used to generate a diagram of the subset of components from the portions of the connectivity data that satisfy the request. Thus, the method, system and computer program product are capable of efficiently creating subsets/families of components from electronic schematic diagrams because the portions of connectivity data that satisfy a request for a subset of components are automatically selected and a diagram of the selected components may be automatically generated.

52 Claims, 7 Drawing Sheets

METHOD, SYSTEM AND COMPUTER PROGRAM PRODUCT FOR AUTOMATICALLY GENERATING A SUBSET OF TASK-BASED COMPONENTS FROM ENGINEERING AND MAINTENANCE DATA

FIELD OF THE INVENTION

The present invention relates to the automatic generation of a subset of components based upon a request that includes information regarding one or more of the component(s).

BACKGROUND OF THE INVENTION

Schematic diagrams include multiple components to illustrate the subject matter of the particular diagram. For example, in the aircraft industry, electrical wiring diagrams are used to illustrate all of the conductive paths among the various elements of the aircraft. Thus, the term component used herein refers to any type of element included in the particular schematic diagram to illustrate the desired subject matter. In electrical wiring diagrams, for instance, components include modules, line replaceable units, plugs, switches, buses, power sources, grounds, wires, connectors, etc.

Typically, the schematic diagrams are embodied in set of multiple hard copy sheets that each include a relatively small portion of the overall schematic diagram. Thus, each sheet in a set includes references to other sheets where the portion of the schematic diagram is continued. These references are typically called "off-sheet references." The hard copy sheet sets are very time-consuming and difficult for users, such as maintenance personnel, to use, particularly when they need to reference more than one component, because they must manually locate one of the components in the sheets and then trace the connection to the other component through sometimes multiple sheets. In addition, many times a component is illustrated on multiple sheets, such as when the component is included in more than one conductive path. Thus, a user must first locate the sheet that includes the desired conductive path associated with the component.

Due to the difficulties involved in manually locating and tracing various components and conductive paths in schematic diagrams that are embodied in sets of multiple hard copy sheets, techniques have been developed for creating electronic schematic diagrams that are much easier and less time-consuming to utilize. For example, the electronic schematic diagrams contain automatic links among the various sheets, such that a user may easily see all of the conductive paths associated with a particular element and may easily navigate through the schematic. Examples of the technologies that create the electronic schematic diagrams and the associated features of the electronic diagrams are discussed in detail in U.S. patent application Ser. No. 09/971,283, entitled "Method, Computer Program Product, and System for Performing Automated Linking Between Sheets of a Drawing Set," U.S. patent application Ser. No. 09/971,155, entitled "Method, Computer Program Product, and System for Creating and Viewing an Intelligent Graphics File Including Parts Information," and U.S. patent application Ser. No. 09/971,149, entitled, "Method, Computer Program Product, and System for Performing Automated Text Recognition and Text Search Within a Graphic File." The contents of each of these applications are hereby incorporated by reference in their entirety.

In many electronic schematic diagrams, it is desirable to illustrate only a portion of the schematic to the user, such as a subset of the components, which also may be called a family of components. For example, if the user is going to work on a particular component, the user may wish to only view the component and any connections between that component and one or more other components, such as the power source and/or ground associated with the component. Thus, in this example, the subset/family of components would include the component to be worked upon, the power source and/or ground associated with the component and any component that connects the component to be worked upon to the power source and/or ground.

Such subsets/families of components must be manually created in conventional electronic schematic diagram technologies. For instance, a person must manually select each component that belongs in each subset/family of components. Thus, creating subsets/families of components for electronic schematic diagrams is a very time-consuming and labor-intensive process. As such, there is a need for a technique that is capable of creating subsets/families of components from electronic schematic diagrams in a more efficient and less time-consuming manner.

BRIEF SUMMARY OF THE INVENTION

The method, system and computer program product for automatically generating a subset of components according to the present invention are capable of efficiently creating subsets/families of components from electronic schematic diagrams and associated data. Because the method, system and computer program product automatically select portions of connectivity data that satisfy a request for a subset of components, the present invention creates the subsets without the need for the manual selection of the components that belong in each subset of components, which greatly reduces the amount of time and labor necessary to generate subsets as compared to conventional techniques for generating subsets of components. In addition, the method, system and computer program product may automatically generate a diagram of the subset of components.

The method, system and computer program product for automatically generating a subset of components from a plurality of components according to the present invention include receiving a request for a subset of components, such as by receiving a unique name and/or a description of at least one component desired in the subset of components. The system includes a client element and the computer program product includes a first executable portion capable of receiving the request. The method, system and computer program product of the present invention also include accessing connectivity data that includes information regarding at least the components and connections among the components, and automatically selecting portions of the connectivity data that satisfy the request to generate the subset of components. In some embodiments of the method, system and computer program product a diagram of the subset of components may also be generated from the portions of the connectivity data that satisfy the request.

The system includes a storage element capable of storing the connectivity data that is accessed and the computer program product includes a second executable portion capable of providing the connectivity data. The system also includes a processing element and the computer program product includes a third executable portion capable of automatically selecting portions of the connectivity data. In some embodiments, the system may include a generation element and the computer program product includes a fourth executable portion capable of generating the diagram. In certain embodiments of the system, the processing element may include the generation element and in certain embodiments of the computer program product, the third executable portion may include the fourth executable portion.

The method, system and computer program product may also include displaying the diagram of the subset of components, such as by a display element in the system or a fifth executable portion in the computer program product.

Examples of certain embodiments of the method, system and computer program product include receiving a request for the subset of components that connect at least two other components and automatically selecting portions of the connectivity data that create at least one path between the at least two other components; receiving a request for the subset of components that connect a source component to a sink component and automatically selecting portions of the connectivity data that create at least one path between the source and sink components; receiving a request for the subset of components that include an Airline Transport Association (ATA) system and/or similar system, such as a Unified Numbering System (UNS), and automatically selecting portions of the connectivity data that include the components of the ATA system and/or similar system and that create at least one path among the components of the ATA system and/or similar system; and receiving a request for the subset of components that include at least one figure-sheet set specification and automatically selecting portions of the connectivity data that include the components of the at least one figure sheet set specification and that create at least one path among the components of the figure sheet set specification(s).

Further examples of certain embodiments of the method, system and computer program product include receiving a request for the subset of components that include a maximum number of components and/or a maximum number of connections and automatically selecting portions of the connectivity data that include the requested maximum number of components and/or maximum number of connections; receiving a request for the subset of components that include a path that is a predefined distance away from a respective component and automatically selecting portions of the connectivity data that include the path that is the predefined distance away from the respective component; and receiving a request for the subset of components included in a repair log and/or maintenance procedure and automatically selecting portions of the connectivity data that include the components in the respective repair log and/or maintenance procedure, which may also include selecting portions of the connectivity data that create at least one path among the components included in the respective repair log and/or maintenance procedure.

Other examples of certain embodiments of the method also include removing at least one component from the automatically selected portions of the connectivity data and directly connecting the components that attach to a removed component prior to generating the diagram of the subset of components. In embodiments in which a diagram of the subset is generated, at least one component may be added to the subset of components after generating the diagram and a diagram of the subset of components including the added component(s) may be re-generated. Similarly, at least one component may be removed from the subset of components after generating the diagram and a diagram of the subset of components without the removed component(s) may be re-generated. The system may remove and/or add components via the processing element and the computer program product may remove and/or add components via the third executable portion. The system may re-generate the diagram via the generation element and the computer program product may re-generate the diagram via the fourth executable portion.

Thus, the method, system and computer program product for generating a subset of components from a plurality of components efficiently create subsets/families of components from electronic schematic diagrams by automatically selecting portions of connectivity data that satisfy a request for a subset of components. Thus, the present invention creates the subsets without the need for the manual selection of the components that belong in each subset of component, which greatly reduces the amount of time and labor necessary to generate the subsets as compared to conventional techniques for generating such subsets of components.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 11:
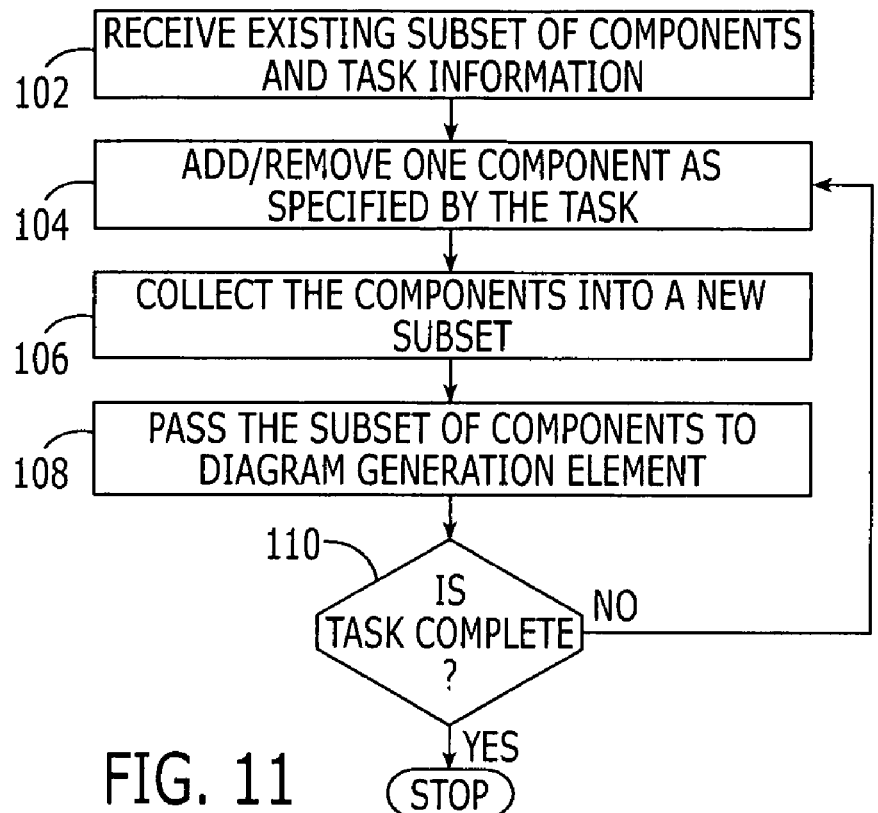
Figure 12:
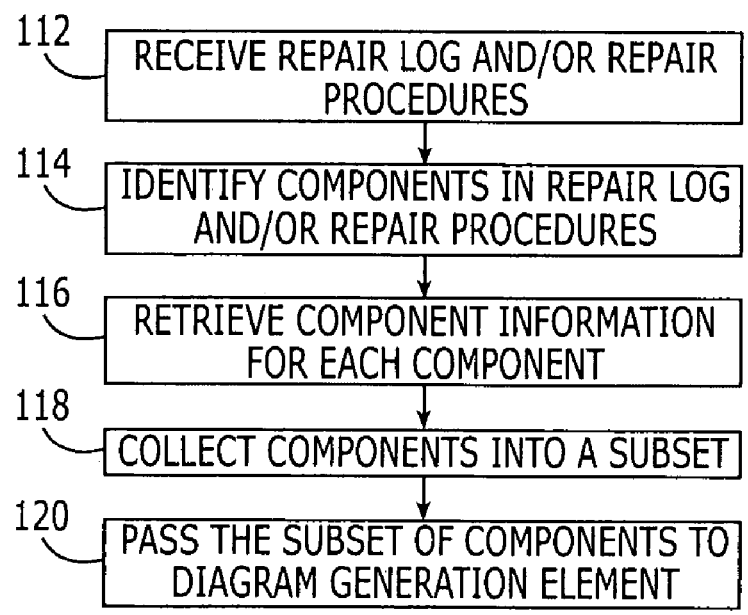

FIG. 11 illustrates a flow diagram of one technique that permits incremental addition or removal of certain components to/from an existing subset of components based upon the steps involved in a specified task according to one embodiment of the present invention; and FIG. 12 illustrates a flow diagram of one technique that identifies and forms a subset of components from a repair log and/or repair procedure according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The method, system and computer program product for automatically generating a subset of components according to the present invention are capable of efficiently creating subsets/families of components from electronic schematic diagrams and associated data. Because the method, system and computer program product automatically select portions of connectivity data that satisfy a request for a subset of components, the present invention creates the subsets without the need for the manual selection of the components that belong in each subset of components, which greatly reduces the amount of time and labor necessary to generate the subsets as compared to conventional techniques for generating such subsets of components. In addition, the method, system and computer program product may automatically generate a diagram of the subset of components.

The method, system and computer program product for automatically generating a subset of components of the present invention may be implemented on any type of system that includes at least one client element, at least one storage element, and at least one processing element, such that requests for information may be received by the client element, various types of information may be stored in the storage element, and selections of appropriate data from the storage element may be made by the processing element based at least in part upon the received requests. In addition, the system may include at least one generation element to generate diagrams reflecting the selected data, if desired.

Figure 1:
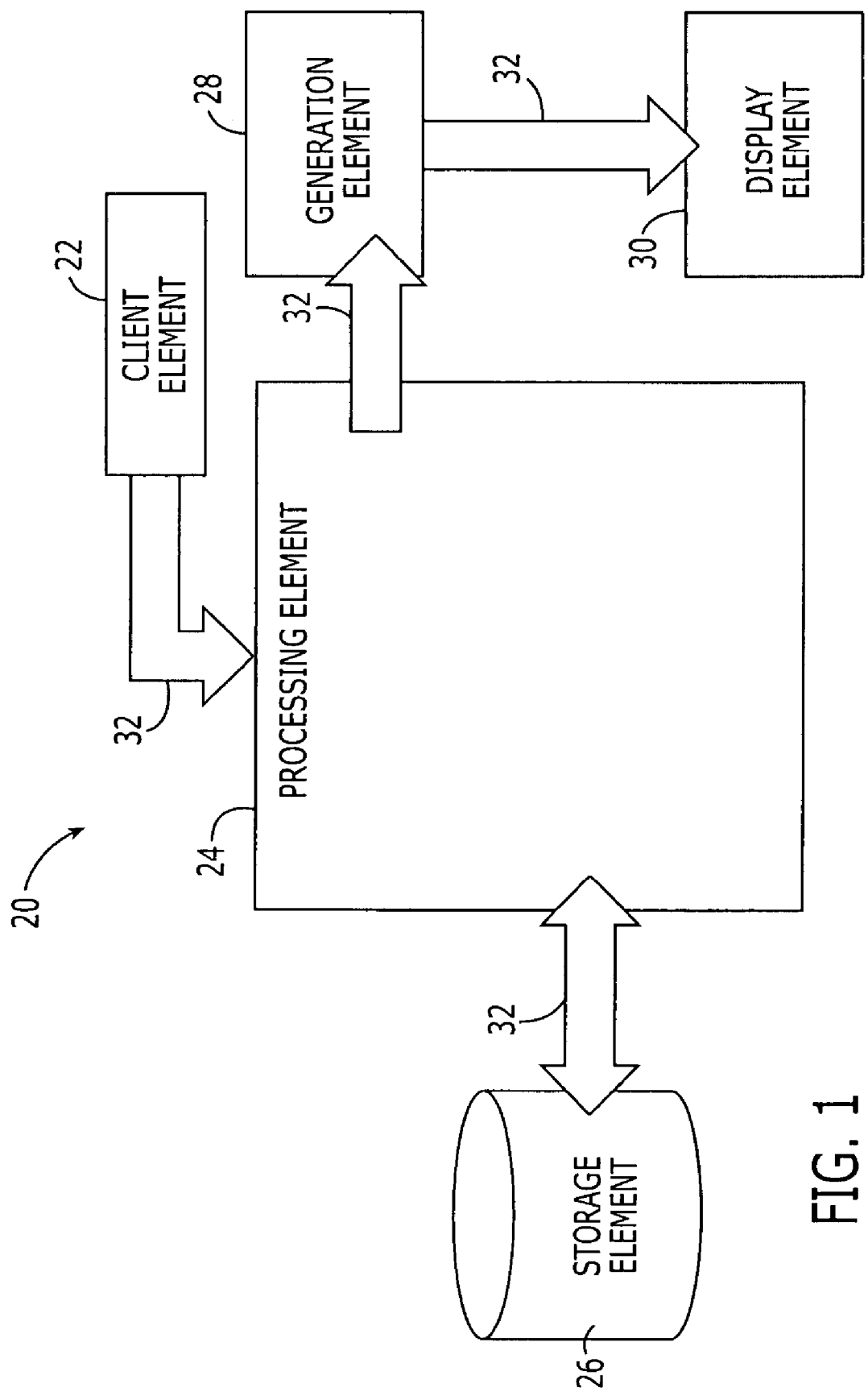
FIG. 1 illustrates a block diagram illustrating the components and the flow of data among the components that provide connectivity data, select portions of the connectivity data and may generate a diagram of the selected connectivity data according to one embodiment of the present invention.

FIG. 1 illustrates one embodiment of the system 20 of the present invention in which a request for a subset of components is received by the client element 22 and transmitted from the client element to the processing element 24. The processing element 24 then selects the appropriate data from storage element 26 based upon the received request, as explained in detail below. The processing element 24 then may transmit the selected data to a generation element 28 where a diagram of the subset of components may be generated, if desired. The system 20 also may include a display element 30 to which the generated diagram may be transmitted for viewing by a user. Although FIG. 1 illustrates one embodiment of how data is transmitted among the client element 22, processing element 24, storage element 26, and, optionally, the generation element 28 and display element 30, data may be transmitted among the client element 22, processing element 24, storage element 26, and, optionally, the generation element 28 and/or display element 30 in any other manner known to those skilled in the art.

The processing element(s) 24 of one embodiment may be embodied by a server, or some other type of computing device. For example, the server may be a web server and an application server that may be located on the same physical device or the web server may be separate from and in communication with the application server via the Internet, intranet or any other computer network. The client element 22, processing element 24, storage element 26, and, optionally, the generation element 28 and/or display element 30 may be part of a single workstation, computer, server or other computing device and, as such, may communicate with each other via internal transmissions. In an alternative embodiment, however, the client element 22, processing element 24, storage element 26, and, optionally, the generation element 28 and/or display element 30 may be distributed as parts of different workstations, computers, servers or computing devices that may be in different physical locations and in communication with each other via the Internet, intranet or other computer network(s) 32. To be consistent, the discussion hereinafter refers to the different elements of the system 20 as being distributed, unless otherwise stated.

The storage element 26 may be a database or any other type of storage device known to those skilled in the art. The storage element 26 may be part of one or more of the client element(s) 22 and/or one or more of the processing element(s) 24, or may be separate from the client element(s) 22, and the processing element(s) 24 and in communication with one or all of the elements via the Internet, intranet or other computer network(s) 32. Regardless of the configuration, if the storage element 26 is a database, it may be accessed by other elements of the system 20 via an interface, such as, but not limited to, a Common Object Request Broker Architecture (CORBA), active data object (ADO) interface or open database connectivity (ODBC) interface.

The client element(s) 22 represent the device or devices that users of the system 20 may utilize to request a subset of components, as will be explained in detail below. The client element(s) 22 may be a laptop computer, a personal computer or workstation, networked personal computers or workstations, or any other type of computing device or configuration operating on any type of computer platform and capable of communications with the processing element(s) 24. Thus, in some embodiments, the display element 30 may be part of the client element 22. For example, the client element(s) 22 may support a browser interface to permit communications with the processing element(s). The browser interface is generally an Internet browser, but other browser interfaces capable of soliciting and receiving user input, and, in a distributed environment, communicating with a computer network may be utilized if desired. The system 20 may include many client elements 22 such that many users may utilize the system 20. The client element(s) 22 may physically be located anywhere as long as the client element(s) 22 are in communication with the processing element(s) 24 either via internal communications or via the Internet, intranet or other computer network in distributed environments.

As described above, the processing element(s) 24 of one advantageous embodiment may include a web and application server(s), which may utilize any modern operating system, such as, but not limited to, Microsoft Windows, UNIX, or Linux, and any modern web development platform, such as, but not limited to, JAVA, commercially available from Sun Microsystems, Inc. One or more application program(s) may reside on the web and application server(s). Among other functions, the processing element(s) 24 provide the techniques (i.e., information/instructions) required to obtain the desired subset of components from the storage element 26 and to provide the desired subset of components to the user, such as via the display element 30 in any appropriate form, such as, but not limited to, a web page form having predefined fields.

The form may be viewed by a user as "screens" via display element 30 and the browser interface. As known to those skilled in the art, the screens may be interactive and prompt the user for the action or information necessary for the system 20 to request certain component subsets, provide the desired subsets and allow any further modification of the subset, as explained in detail below. After the user submits responses to the prompts provided by a screen and/or selects certain options presented on the screen, the processing element(s) 24 can determine the content and prompts to be provided by successive screens. The processing element(s) 24 may access/query the storage element 26 to provide the content for any of the screens, such as a diagram of the requested component subset, based upon the actions taken by the user and/or the request of the user. For example, if a user, such as a maintenance worker, requests a certain subset of components, the processing element(s) 24 receive the request from the user via a client element 22 and select the appropriate data from the storage element 26 to generate the requested subset of components. The generation element 28 then may utilize the selected data to generate a diagram of the subset of components and populate and format a screen containing the requested subset in diagram form, and submit the screen to the display element 30 for viewing by the user. In one embodiment of the present invention, for instance, the generation element 28 includes a wiring support product, such as Wiring Illuminator or Wiring Illuminator Web, commercially available from Continental Data Graphics, Inc.

With reference to FIG. 1, the system 20 is capable of automatically generating a subset of components from a plurality of components. In particular, client element 22 is capable of receiving a request to generate a subset of components from a user, the storage element 26 is capable of storing connectivity data that includes information regarding at least the components and the connections among the components, and the processing element 24 is capable of automatically selecting portions of the connectivity data from the storage element 26 that satisfy the request for the subset of components. In some embodiments, the generation element 28 may then generate a diagram of the subset of components from the portions of connectivity data that satisfy the request for the subset of components.

The storage element 26, therefore, receives connectivity data regarding components and the connections among the components from various sources, such as from engineering and maintenance data sources, which include schematic diagrams and associated data. In one embodiment of the present invention, the components represent the elements of aircraft wiring diagrams, such as the modules, line replaceable units, plugs, switches, buses, power sources, grounds, wires, connectors, etc. In other embodiments of the present invention, the components could represent the elements of any other type of schematics, such as a hydraulic, fuel or any other type of subsystem for any type of structure, such as automobiles, ships, buildings, etc.

The storage element 26 therefore includes information regarding the components of the desired type of schematic and the connections among the components. The storage element 26 may be populated in any manner known to those skilled in the art, from manually to automatically. For example, in one embodiment of the present invention, the storage element 26 may be at least partially populated using an electronic graphic recognition program, as described in U.S. patent application Ser. No. 09/971,283, entitled "Method, Computer Program Product, and System for Performing Automated Linking Between Sheets of a Drawing Set," U.S. patent application Ser. No. 09/971,155, entitled "Method, Computer Program Product, and System for Creating and Viewing an Intelligent Graphics File Including Parts Information," and U.S. patent application Ser. No. 09/971,149, entitled, "Method, Computer Program Product, and System for Performing Automated Text Recognition and Text Search Within a Graphic File," all of which are incorporated herein in their entirety by reference.

As described in the above-referenced applications, legacy graphic files, such as raster graphic files, of the desired schematics may be reviewed by a recognition application, which may be a commercial application program that separates the graphic artwork from the text and performs optical character recognition (OCR) on the electronic graphic files. The recognition application may be provided as an image-processing engine in the form of a software library. Data and heuristics supplied by a system builder facilitate the recognition application to accurately identify the reference designations and the relationships among the reference designations within the legacy graphic file. Reference designations include not only the alphanumeric text included in the graphic, but also the graphics that represent the components. For example, the system builder supplies the recognition application with character set examples, alphanumeric rules, character size ranges, and graphic patterns for the reference designations that the system builder may expect in the legacy graphic file. In the same way, the system builder may use the heuristics to manipulate which reference designations are discovered by the recognition application such that certain reference designations may be ignored. The recognition application, thus, may discover and record the reference designations and the relationships among the reference designations present in the legacy graphic file. One example of a commercial application program that may serve as the recognition application is Cartouche, provided by RAF Technology of Redmond, Wash. The reference designations and the relationships among the reference designations then may be stored in the storage element 26 to be available for extraction when desired.

In addition, or alternatively, the storage element 26 may include information regarding the components and the connections among the components from other sources that extract such information. For example, the storage element 26 may include information from Computer-Aided Drawing (CAD) databases, wiring databases, repair/replacement procedures, fault isolation manuals, maintenance manuals, wiring diagram manuals, schematics manuals, as well as SGML or XML datastreams derived from any of these sources.

Once the connectivity data is assembled into the storage element 26, component families/subsets maybe defined from the connectivity data. In conventional systems, the component families/subsets had to be manually generated.

The present invention, therefore, provides a method, system and computer program product for automatically generating subsets of components from the connectivity data, as described below.

A component family/subset may be defined dynamically at the time a request is received for the component family/subset (i.e., real-time) or anytime prior to receiving a request for the component family/subset, such as during a batch process. In various embodiments of the system 20, each of the various component families/subsets may be dynamically defined and/or defined in a batch process.

After a request for a subset of components is received, the processing element 24 automatically selects the appropriate component information from the storage element 26. Thus, the processing element 24 is capable of utilizing task-based techniques or any other type of instructions to automatically generate the requested component subsets from the connectivity data in the storage element 26. FIGS. 2, 4, and 7-12 illustrate various embodiments of the techniques utilized by the processing element 24 to produce the requested component subsets. As described below, the inputs to a technique, such as an algorithm, may be obtained from the user, such as via the client element 22, or any other portion of the system 20.

A user may request a subset of components in any manner known to those skilled in the art. For example, a user may submit a list of one or more components, such as by specifying a unique name for the component(s) and/or by providing a description of the component(s). In the example of a wiring diagram, if the user would like a subset of components that includes a particular wire and its end points, the user could submit the unique name for the wire and the end point components. Alternatively, the user could generally describe one or more characteristics of the wire, such as its size, its location, the unique name of at least one of the end points, or any other distinguishing feature. In other embodiments, the user may view at least a portion of a schematic and select one or more graphics that represent components to include in the requested subset of components and/or the user may view a table of contents of various types of components and select from the table of contents one or more components to include in the requested subset of components.

Figure 2:
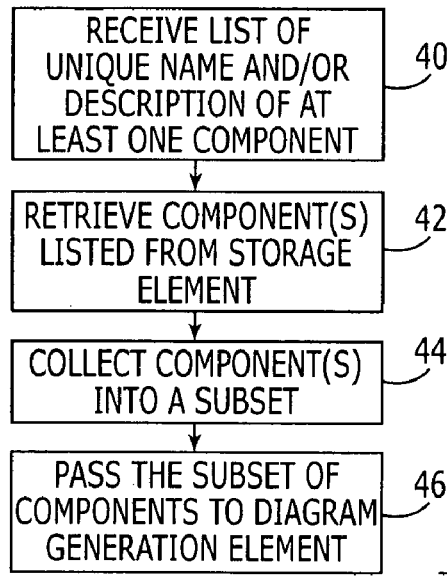
FIG. 2 illustrates a flow diagram of one technique that creates a subset of components that connect to a respective component according to one embodiment of the present invention.
Figure 3:
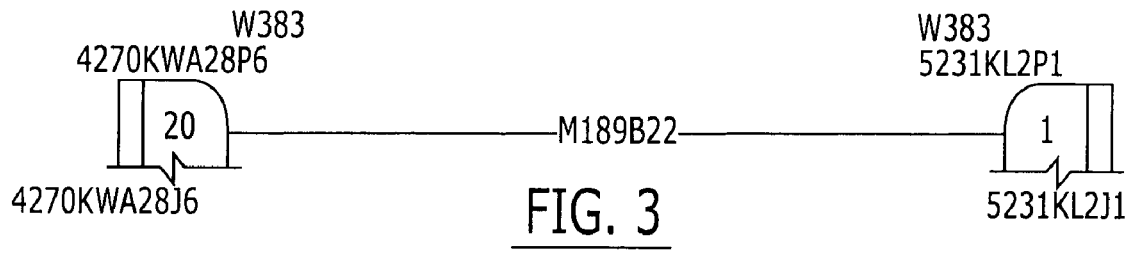
FIG. 3 illustrates a diagram that is generated for a subset of components that includes wire and its end points according to one embodiment of the present invention.

FIG. 2 illustrates one embodiment of one technique that creates a subset of components that connect to a component. For example, as described above, a request for a wire or a wire bundle and its end points may be received. Thus, the processing element 24 receives the request that includes at least one component and information regarding at least one other type of component that is desired for the subset (step 40). The processing element 24 then automatically selects the appropriate components from the connectivity data in the storage element 26 (step 42). For example, when a wire and its end points are requested, the processing element automatically selects the desired wire and the components that directly connect to the wire from the storage element 26. The selected components are then collected into a subset (step 44) and may be passed to a diagram generation element (step 46), such as generation element 28, if a diagram of the subset of components is desired. FIG. 3 illustrates one embodiment of the diagram that may be generated for a wire and end point subset. Thus, the diagram of FIG. 3 illustrates wire M189B22 connected to end point 5231KL2P1 and endpoint 4270 KWA28P6.

Figure 4:
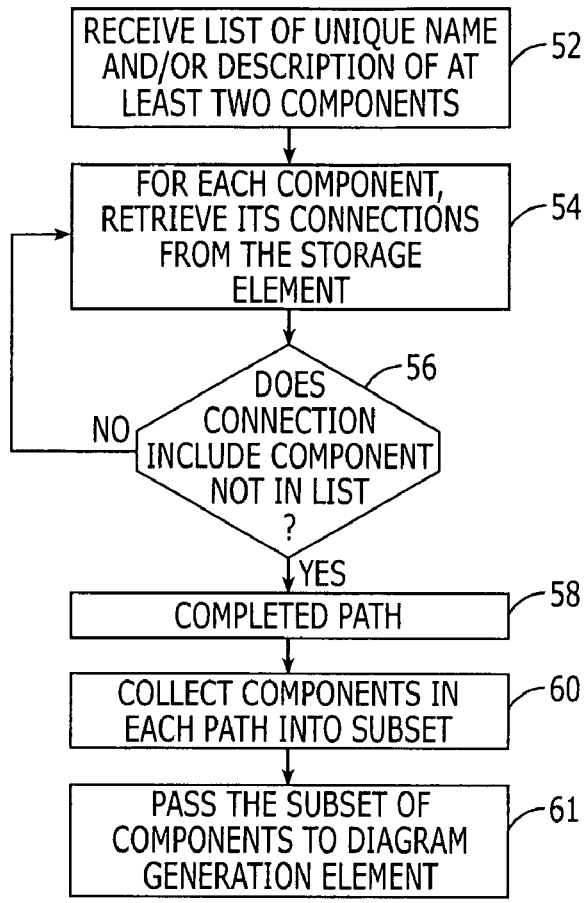
FIG. 4 illustrates a flow diagram of one technique that creates a subset of components that connect at least two other components according to one embodiment of the present invention.
Figure 5:
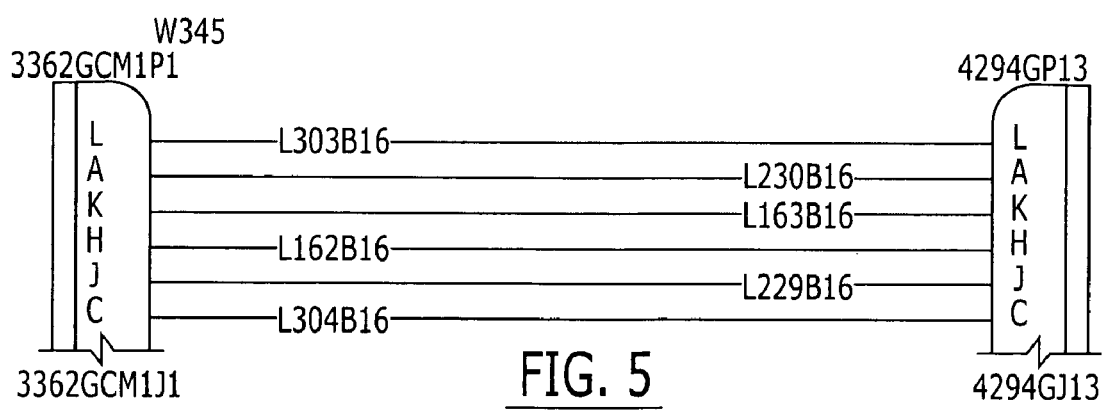
FIG. 5 illustrates a diagram that is generated for a subset of components that includes the requested plugs and the selected wires L303B16, L230B16, L163B16, L162B16, L229B16 and L304B16 that connect the plugs according to one embodiment of the present invention.

FIG. 4 illustrates one embodiment of one technique that creates a subset of components that connect at least two other components. Thus, a request to generate a subset of components that connect at least two other components is received (step 52). For example, a user may request the subset of components that connect plug 3362GCM1P1 to plug 4294GP13 (see FIG. 5). Thus, the processing element 24 automatically selects the component(s) that connect the specified plugs from the connectivity data stored in the storage element 26 and creates the requested subset. As shown in FIG. 4, for each component in the request, the processing element retrieves the next component to which it is connected (step 54). The processing element 24 then determines whether the retrieved component is included in the requested components (step 56). If not, the processing element continues retrieving the next connected component (step 54). If the retrieved component is included in the requested components, the processing element has found a completed path (step 58). The components selected in each path are then collected into a subset (step 60) and may be passed to a diagram generation element (step 61), such as generation element 28, if a diagram of the subset of components is desired. FIG. 5 illustrates a diagram that may be generated from the subset that includes the requested plugs and the selected wires L303B16, L230B16, L163B16, L162B16, L229B16 and L304B16 that connect the plugs. In instances in which the specified plugs are connected by multiple distinct paths, the processing element 24 may be configured to identify each of the paths, if so desired. Moreover, if the processing element 24 selects a component during the process of attempting to trace a path between the selected plugs and arrives at an endpoint without having completed the desired path between the plugs, the processing element can begin again and select different components.

Figure 6:
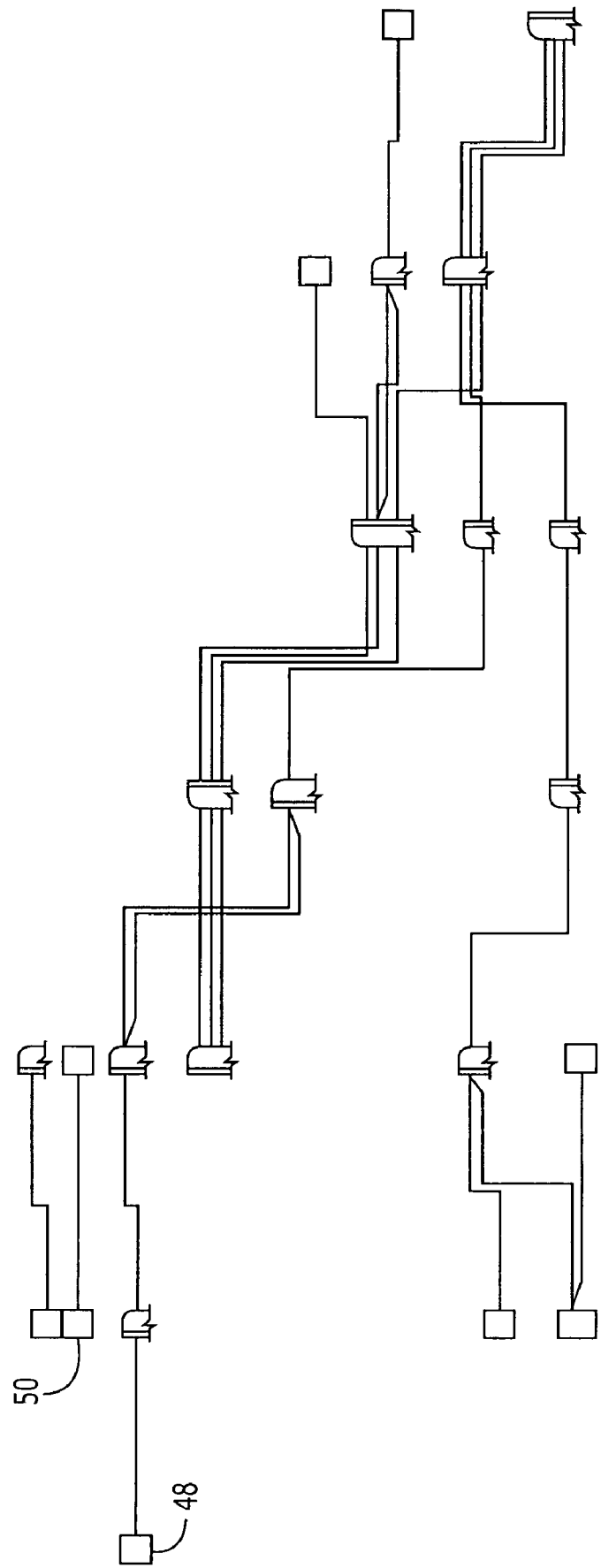
FIG. 6 illustrates a diagram that is generated for a subset of components that includes a source element, a sink element and the components that connect the source element to the sink element according to one embodiment of the present invention.

A further example of the embodiment of the technique of FIG. 4 includes a request for the subset of components that connect a power source, such as a battery, and sink element, such as a ground. For instance, a user may request the subset of components that connect a certain source element to one or more sink elements. The processing element 24 then automatically selects the component(s) that connect the desired source and sink elements from the connectivity data in the storage element 26 in the same manner as described above regarding FIG. 4. FIG. 6 illustrates the diagram that may be generated from the subset that includes the source element 48, the sink element 50 and the components that connect source element 48 to sink element 50. In other embodiments, the processing element 24 may trace the connections from a source element outward until each path reaches a sink element. Thus, the subset and generated diagram would include the source element, the sink elements and all of the components that connect the source element to a sink element.

Figure 7:
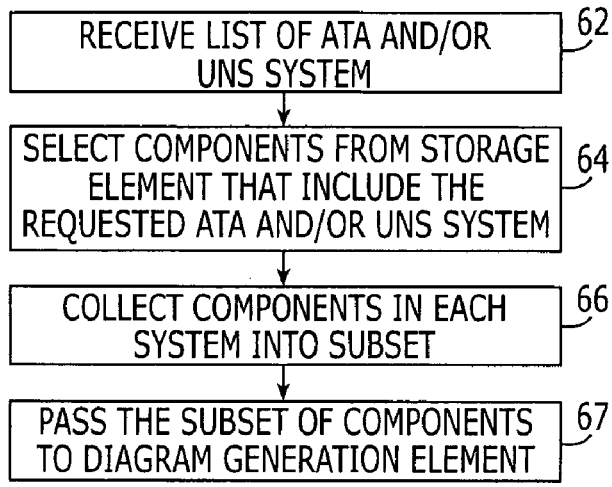
FIG. 7 illustrates a flow diagram of one technique that creates a subset of components that includes an Airline Transport Association (ATA) system and/or Unified Numbering System (UNS) according to one embodiment of the present invention.

Although the present invention has applicability to a wide variety of industries, one more particular example, as shown by FIG. 7, which illustrates an embodiment of one technique that creates a subset of components that includes an Airline Transport Association (ATA) system and/or a Unified Numbering System (UNS), which includes an ATA and/or UNS subsystem, ATA and/or UNS sub-subsystem, etc. Thus, a request for a subset of components that includes an ATA system and/or UNS is received (step 62). For example, a user may request a subset of the components that make up the ATA 33-12 left instrument panel system, ATA 33-12-22 landing gear system, ATA 52-31 cargo ramp/door control system, ATA 78-51 exhaust deflectors system, or any other ATA system. The processing element 24 then selects the components from the connectivity data of the storage element 26 that include a reference to the requested ATA and/or UNS system (step 64). Any connections among the components that do not include the reference to the requested ATA and/or UNS system may also be selected by the processing element 24 in a manner similar to that described with reference to FIG. 4 to determine the connection paths among the components of the ATA and/or UNS system. The components of the requested ATA and/or UNS system are then collected into a subset (step 66) and may be passed to a diagram generation element (step 67), such as generation element 28, if a diagram of the subset of components is desired.

Figure 8:
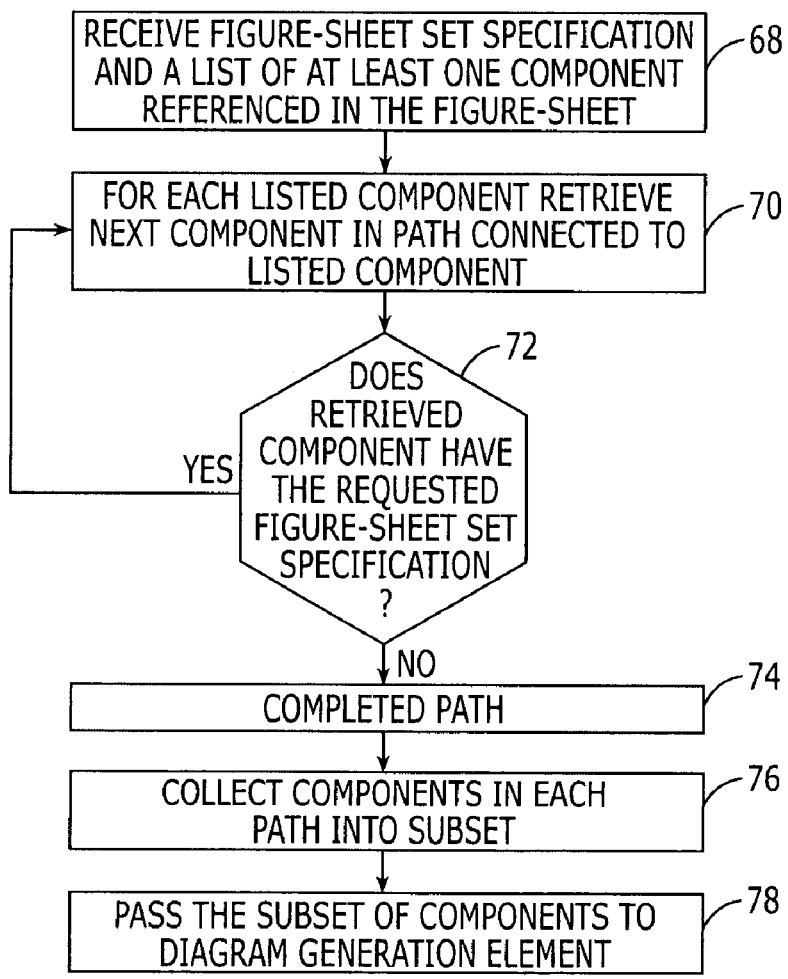
FIG. 8 illustrates a flow diagram of one technique that creates a subset of components that are contained in a certain figure-sheet set specification according to one embodiment of the present invention.

FIG. 8 illustrates one embodiment of one technique that creates a subset of components that are contained in a certain figure-sheet set specification. Thus, a request to generate a subset of components that are contained in a certain figure-sheet set specification is received (step 68). Thus, a request for a specific figure-sheet set specification, such as FIG. 32-42-01, which contains two sheets showing the hydraulic backup break power in an aircraft wiring diagram, may be received along with one or more components that are referenced in the requested figure-sheet set specification. For each requested component, the processing element 24 retrieves the next component to which it is connected (step 70). The processing element 24 then determines whether the retrieved component has the requested figure-sheet set specification (step 72). If so, the processing element continues retrieving the next connected component (step 70). If the retrieved component does not have the requested figure-sheet set specification, the processing element has found a completed path (step 74). The components selected in each path are then collected into a subset (step 76) and may be passed to a diagram generation element (step 78), such as generation element 28, if a diagram of the subset of components is desired.

Figure 9:
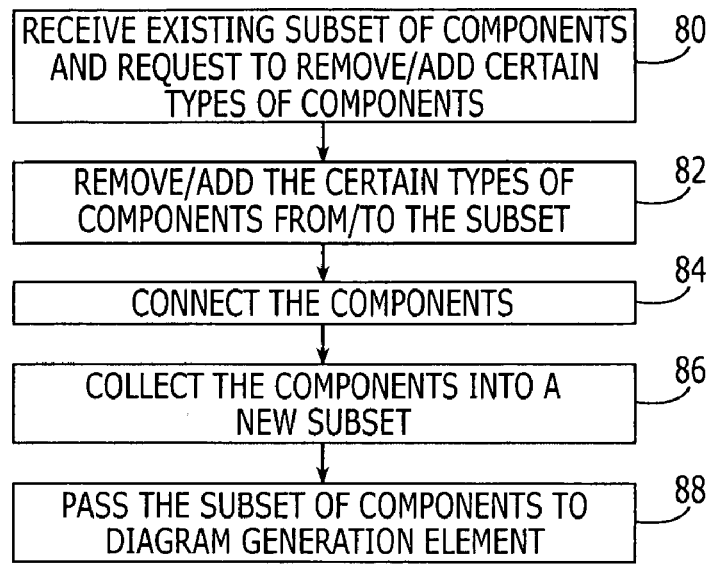
FIG. 9 illustrates a flow diagram of one technique that removes or adds certain components from an existing subset of components to create a new subset of components according to one embodiment of the present invention.

FIG. 9 illustrates one embodiment of one technique that removes or adds certain components from an existing subset of components to create a new subset of components. For example, an existing subset of components and a request to remove certain types of components from the existing subset may be received (step 80). In a specific embodiment, a request to remove certain lower-level components, such as switches and/or circuit breakers, from a wiring diagram may be received. Thus, the processing element 24 removes the lower-level components from the existing subset (step 82) and connects the remaining components (step 84). The components are then collected into a new subset (step 86) and may be passed to a diagram generation element (step 88), such as generation element 28, if a diagram of the subset of components is desired. The resulting diagram would, therefore, represent only the high-level components.

The embodiment of FIG. 9 may be repeated using the new subset with only the high-level components as the existing subset when a request is received to remove further components to create a new subset of components. For example, the subset of only high-level components and a request to remove all components except certain functional modules, such as line-replaceable units in an aircraft, and wires from the existing subset may be received (step 80). Alternatively, the step of removing only the lower-level components may be skipped, such that the original subset may be received and a request to remove all components except certain functional modules and wires may be received. Thus, the processing element 24 removes all of the components except the specified functional modules and wires from the existing subset (step 82) and connects the remaining components (step 84). The components are then collected into a new subset (step 86) and may be passed to a diagram generation element (step 88), such as generation element 28, if a diagram of the subset of components is desired. The resulting diagram would, therefore, represent only the functional-level components.

The embodiment of FIG. 9 may, again, be repeated using the new subset with only the functional-level components as the existing subset when a request is received to group together certain functional modules to create a new subset of components. For example, the subset of only functional-level components and a request to group together certain functional modules, such as line-replaceable units in an aircraft in the existing subset may be received (step 80). Alternatively, the step of removing only the lower-level components and/or all of the components except the functional modules and wires may be skipped, such that the original subset or high-level component subset may be received and a request to group together certain functional modules may be received. Thus, the processing element 24 removes the specified functional modules from the existing subset and replaces them with an indication, such as a block, that represents the group of functional modules (step 82) and connects the remaining components (step 84). The components are then collected into a new subset (step 86) and may be passed to a diagram generation element (step 88), such as generation element 28, if a diagram of the subset of components is desired. The resulting diagram would, therefore, represent block-level components.

In further embodiments of FIG. 9, components may be added to existing subsets instead of removed. For example, an existing high-level or block-level subset may be received with a request to add certain components, such as separating the groupings of functional modules and/or adding lower-level components, such as circuit breakers and/or switches in wiring diagram embodiments (step 80). The processing element 24 then adds the requested components to the existing subset (step 82) and connects the new and/or existing components (step 84). The components are collected into a new subset (step 86) and may be passed to a diagram generation element (step 88), such as generation element 28, if a diagram of the subset of components is desired.

Figure 10:
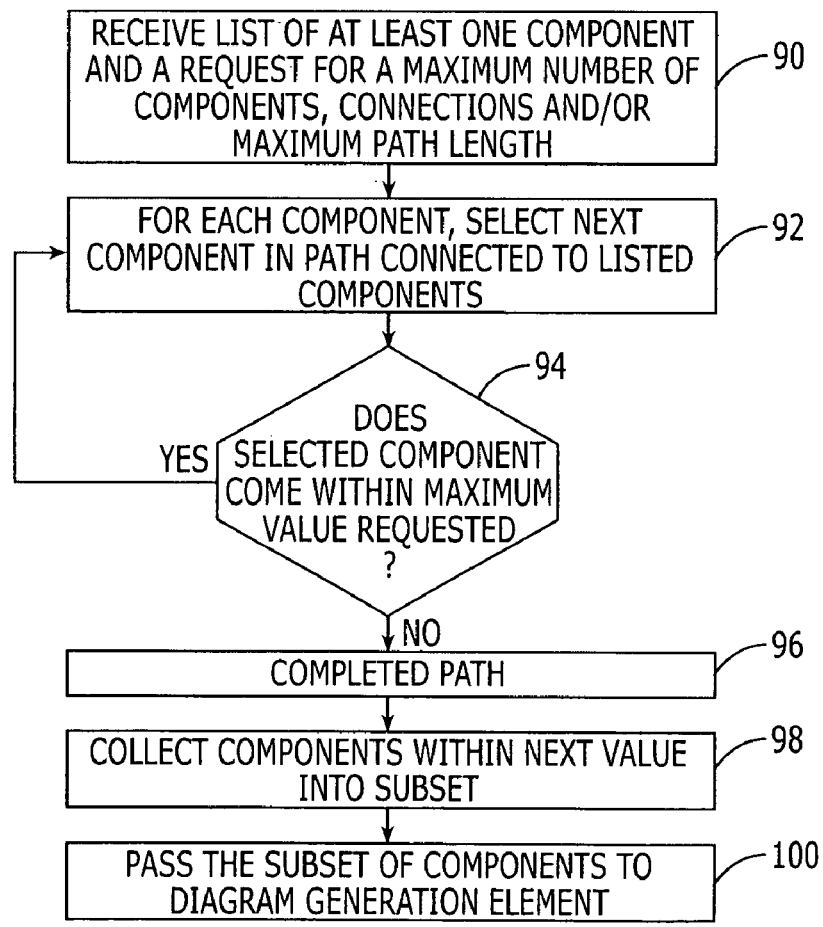
FIG. 10 illustrates a flow diagram of one technique that specifies a maximum number of components, a maximum number of connections and/or a maximum connection path length from a respective component for a subset of components according to one embodiment of the present invention.

FIG. 10 illustrates one embodiment of a technique that specifies a maximum number of components, a maximum number of connections and/or a maximum connection path length from a respective component for a subset of components. For example, at least one component and a maximum number of components, a maximum number of connections and/or a maximum connection path length from a respective component may be received (step 90). For each requested component, the processing element 24 retrieves the next component to which it is connected (step 92). The processing element 24 then determines whether the retrieved component comes within the maximum values requested (step 94). For example, if the request includes a maximum of 4 components in the subset, then the processing element 24 determines whether the addition of the retrieved component still leaves the subset with less than 4 total components. If so, the processing element continues retrieving the next connected component until the maximum is reached (step 72). If the retrieved component causes the resulting subset to equal the maximum, the processing element has found a completed path (step 96). The components selected in each path are then collected into a subset (step 98) and may be passed to a diagram generation element (step 100), such as generation element 28, if a diagram of the subset of components is desired. In further embodiments, if a user wishes to generate a subset with more of the components, connections and/or paths, then the user may modify the maximum amount requested and the process of the embodiment of FIG. 9 may be continued to create a new subset of components that comes within the new maximum amount.

FIG. 11 illustrates one embodiment of a technique that permits incremental addition or removal of certain components to/from an existing subset of components based upon the steps involved in a specified task. For example, an existing subset and information regarding a task involving the subset may be received (step 102). In one embodiment an existing subset of two plugs, the wires that connect the plugs and a test procedure for testing the wires for short-circuit may be received. As the task is performed on each component, i.e., as each wire is tested, the respective component may be removed (step 104). After a component is removed, the remaining components are collected into a new subset (step 106) and may be passed to a diagram generation element (step 108), such as generation element 28, if a diagram of the subset of components is desired. The processing element 24 then determines if the task is completed (step 110). If it is, the process stops. If the task is not completed, then the next component i.e., the next tested wire, is removed (step 104) and the process continues until the task is completed.

Another example of the embodiment of FIG. 11 may include receiving an existing subset of components that includes only two plugs and a task involving the addition of wires between the two plugs (step 102). Thus, as the task is performed, i.e., as each wire is added, the respective component is added to the existing subset (step 104). After a component is added, the new and existing components are collected into a new subset (step 106) and may be passed to a diagram generation element (step 108), such as generation element 28, if a diagram of the subset of components is desired. The processing element 24 then determines if the task is completed (step 110). If it is, the process stops. If the task is not completed, then the next component i.e., the next tested wire, is added (step 104) and the process continues until the task is completed.

FIG. 12 illustrates one embodiment of a technique that identifies and forms a subset of components from a repair log and/or repair procedure. For example, a repair log and/or repair procedure may be received (step 112). The components in the repair log and/or procedure then may be identified, such as with text pattern-matching techniques known to those skilled in the art (step 114). The processing element 24 retrieves information regarding the identified components from the connectivity data in the storage element 26 (step 116). The information regarding the identified components that is retrieved from the storage element may indicate how each of the identified components connect to one another, the other components that provide the connection paths among the identified components, and/or only the next component to which the identified components are connected, depending upon the desired amount of information regarding the connections among the components, which may be specified when the subset request is received. The identified components and any further retrieved component information may be collected into a subset (step 118) and may be passed to a diagram generation element (step 120), such as generation element 28, if a diagram of the subset of components is desired.

While the embodiments described above provide specific examples of how techniques for providing particular subsets of components are created based upon the content of certain requests, any other type of request for any other subset(s) of components may be received and the subset created by the method, system 20 and computer program product of the present invention. For example regarding a wiring diagram, the techniques described above and/or other techniques may be utilized to generate subsets of components that represent circuit paths that begin at a certain location and stop when a certain type of component, such as a bus bar, is reached. In a further example regarding an aircraft wiring diagram, the techniques described above and/or other techniques may be utilized to generate subsets of components that represent circuit paths that only include switch branches set to a current aircraft configuration.

The system 20 of the present invention and, in particular, the processing element 24, and storage element 26, are typically embodied by a processing element and an associated memory device, both of which are commonly comprised by a computer or the like. As such, the system of the present invention generally operates under control of a computer program product to provide the functionality described hereinabove in conjunction with the various components of the system, according to another aspect of the present invention. The computer program product for constructing the desired subset(s) of components includes a computer-readable storage medium, such as the non-volatile storage medium, and computer-readable program code portions, such as a series of computer instructions, embodied in the computer-readable storage medium.

In this regard, FIGS. 2, 4 and 7-12 are block diagrams and flowcharts of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems, which perform the specified functions or steps, or combinations of special purpose hardware and computer instructions.

Thus, the method, system 20 and computer program product for automatically generating a subset of components according to the present invention are capable of efficiently creating subsets/families of components from electronic schematic diagrams and associated data. Because the method, system and computer program product automatically select portions of connectivity data that satisfy a request for a subset of components, the present invention creates the subsets without the need for the manual selection of the components that belong in each subset of components, which greatly reduces the amount of time and labor necessary to generate subsets as compared to conventional techniques for generating subsets of components. In addition, the method, system and computer program product may automatically generate a diagram of the subset of components.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for automatically generating a subset of components from a plurality of components, comprising:
   receiving a request to generate a subset of components;
   accessing connectivity data comprising information regarding at least the plurality of components and connections among the plurality of components;
   automatically selecting portions of the connectivity data that satisfy the request to generate the subset of components, wherein automatically selecting portions of the connectivity data comprises:
   for an initial component in the subset of components, identifying another component connected to the initial component based upon the connectivity data;
   adding the other component to the subset of components; and
   repeating the identifying and adding steps with the other component being the initial component;
   generating a diagram based upon the automatically selected portions of the connectivity data of only the subset of components without other components from the plurality of components that are not included in the subset of components; and
   displaying the diagram of only the subset of components without other components from the plurality of components that are not included in the subset of components.

2. The method of claim 1, wherein receiving a request comprises receiving a unique name of at least one component desired in the subset of components.

3. The method of claim 1, wherein receiving a request comprises receiving a description of at least one component desired in the subset of components.

4. The method of claim 1, wherein receiving a request comprises receiving a request for the subset of components that connect at least two other components, and wherein automatically selecting portions of the connectivity data comprises selecting portions of the connectivity data that create at least one path between the at least two other components.

5. The method of claim 1, wherein receiving a request comprises receiving a request for the subset of components that connect a source component to a sink component, and wherein automatically selecting portions of the connectivity data comprises selecting portions of the connectivity data that create at least one path between the source component and the sink component.

6. The method of claim 1, wherein receiving a request comprises receiving a request for the subset of components that connect a respective component to at least one of a source component and a sink component, and wherein automatically selecting portions of the connectivity data comprises selecting portions of the connectivity data that create at least one path between the respective component and at least one of the source component and the sink component.

7. The method of claim 1, wherein receiving a request comprises receiving a request for the subset of components that comprises at least one of an Airline Transport Association (ATA) system and a Unified Numbering System (UNS), and wherein automatically selecting portions of the connectivity data comprises selecting portions of the connectivity data that include the components of the at least one of the ATA system and the UNS and that create at least one path among the components of the at least one of the ATA system and the UNS.

8. The method of claim 1, wherein receiving a request comprises receiving a request for the subset of components that comprises at least one figure-sheet set specification, and wherein automatically selecting portions of the connectivity data comprises selecting portions of the connectivity data that include the components of the at least one figure sheet set specification and that create at least one path among the components of the at least one figure sheet set specification.

9. The method of claim 1, further comprising:
   removing at least one component from the automatically selected portions of the connectivity data that satisfy the request for the subset of components; and
   directly connecting the components that attach to a removed component prior to generating the diagram of the subset of components.

10. The method of claim 1, wherein receiving a request comprises receiving a request for the subset of components that comprises at least one of a maximum number of components and a maximum number of connections, and wherein automatically selecting portions of the connectivity data comprises selecting portions of the connectivity data that satisfy the at least one requested maximum number of components and maximum number of connections.

11. The method of claim 1, wherein receiving a request comprises receiving a request for the subset of components that comprise a path that is located a predefined distance away from a respective component, and wherein automatically selecting portions of the connectivity data comprises selecting portions of the connectivity data that include the path that is located the predefined distance away from the respective component.

12. The method of claim 1, further comprising adding at least one component to the subset of components after generating the diagram of the subset of components and re-generating a diagram of the subset of components including the at least one added component.

13. The method of claim 1, further comprising removing at least one component from the subset of components after generating the diagram of the subset of components and re-generating a diagram of the subset of components without the at least one removed component.

14. The method of claim 1, wherein receiving a request comprises receiving a request for the subset of components included in a repair log, and wherein automatically selecting portions of the connectivity data comprises selecting portions of the connectivity data that include the components included in the repair log.

15. The method of claim 14, wherein automatically selecting portions of the connectivity data further comprises selecting portions of the connectivity data that create at least one path among the components included in the repair log.

16. The method of claim 1, wherein receiving a request comprises receiving a request for the subset of components included in a maintenance procedure, and wherein automatically selecting portions of the connectivity data comprises selecting portions of the connectivity data that include the components included in the maintenance procedure.

17. The method of claim 16, wherein automatically selecting portions of the connectivity data further comprises selecting portions of the connectivity data that create at least one path among the components included in the maintenance procedure.

18. The method of claim 1 wherein automatically selecting portions of the connectivity data further comprises terminating the repeating upon satisfying a predefined condition.

19. A system for automatically generating a subset of components from a plurality of components, comprising:
   a client element capable of receiving a request to generate a subset of components from a user;
   a storage element capable of storing connectivity data comprising information regarding at least the plurality of components and the connections among the plurality of components;

a processing element capable of automatically selecting portions of the connectivity data from said storage element that satisfy the request from said client element to generate the subset of components, wherein the processing element is configured to automatically select portions of the connectivity data by being configured to:

for an initial component in the subset of components, identify another component connected to the initial component based upon the connectivity data;

add the other component to the subset of components; and repeat the identification and addition with the other component being the initial component;

a generation element capable of generating a diagram of the subset of components from the portions of the connectivity data that were determined by said processing element to satisfy the request to generate the subset of components without other components from the plurality of components that are not included in the subset of components; and a display element, responsive to said generation element, configured to display the diagram of only the subset of components without other components from the plurality of components that are not included in the subset of components.

20. The system of claim 19, wherein said client element is also capable of receiving a request for the subset of components that connect at least two other components, and wherein said processing element is also capable of automatically selecting portions of the connectivity data that create at least one path between the at least two other components.

21. The system of claim 19, wherein said client element is also capable of receiving a request for the subset of components that connect a source component to a sink component, and wherein said processing element is also capable of automatically selecting portions of the connectivity data that create at least one path between the source component and the sink component.

22. The system of claim 19, wherein said client element is also capable of receiving a request for the subset of components that connect a respective component to at least one of a source component and a sink component, and wherein said processing element is also capable of automatically selecting portions of the connectivity data that create at least one path between the respective component and at least one of the source component and the sink component.

23. The system of claim 19, wherein said client element is also capable of receiving a request for the subset of components that comprises at least one of an Airline Transport Association (ATA) system and a Unified Numbering System (UNS), and wherein said processing element is also capable of automatically selecting portions of the connectivity data that include the components of the at least one of the ATA system and the UNS and that create at least one path among the components of the at least one of the ATA system and the UNS.

24. The system of claim 19, wherein said client element is also capable of receiving a request for the subset of components that comprises at least one figure-sheet set specification, and wherein said processing element is also capable of automatically selecting portions of the connectivity data that include the components of the at least one figure sheet set specification and that create at least one path among the components of the at least one figure sheet set specification.

25. The system of claim 19, wherein said processing element is further capable of removing at least one component from the automatically selected portions of the connectivity data that satisfy the request for the subset of components and directly connecting the components that attach to a removed component.

26. The system of claim 19, wherein said client element is also capable of receiving a request for the subset of components that comprises at least one of a maximum number of components and a maximum number of connections, and wherein said processing element is also capable of automatically selecting portions of the connectivity data that satisfy the at least one requested maximum number of components and maximum number of connections.

27. The system of claim 19, wherein said client element is also capable of receiving a request for the subset of components that comprise a path that is located a predefined distance away from a respective component, and wherein said processing element is also capable of automatically selecting portions of the connectivity data that include the path that is located the predefined distance away from the respective component.

28. The system of claim 19, wherein said processing element comprises said generation element.

29. The system of claim 19, wherein said processing element is further capable of adding at least one component to the subset of components after the diagram of the subset of components is generated and said generation element is also capable of re-generating a diagram of the subset of components including the at least one added component.

30. The system of claim 19, wherein said processing element is further capable of removing at least one component from the subset of components after the diagram of the subset of components is generated and said generation element is also capable of re-generating a diagram of the subset of components without the at least one removed component.

31. The system of claim 19, wherein said client element is also capable of receiving a request for the subset of components included in a repair log, and wherein said processing element is also capable of automatically selecting portions of the connectivity data that include the components included in the repair log.

32. The system of claim 31, wherein said processing element is further capable of automatically selecting portions of the connectivity data that create at least one path among the components included in the repair log.

33. The system of claim 19, wherein said client element is also capable of receiving a request for the subset of components included in a maintenance procedure, and wherein said processing element is also capable of automatically selecting portions of the connectivity data that include the components included in the maintenance procedure.

34. The system of claim 33, wherein said processing element is further capable of automatically selecting portions of the connectivity data that create at least one path among the components included in the maintenance procedure.

35. The system of claim 19 wherein the processing element is further configured to terminate the repeating upon satisfying a predefined condition.

36. A computer program product for automatically generating a subset of components from a plurality of components, the computer program product comprising a computer-readable storage medium having computer-readable program code portions stored therein, the computer-readable program code portions comprising:

a first executable portion receiving a request to generate a subset of components from a user;

a second executable portion providing connectivity data comprising information regarding at least the plurality of components and the connections among the plurality of components;

a third executable portion automatically selecting portions of the connectivity data provided by said second executable portion that satisfy the request to generate the subset of components that is received by said first executable portion, wherein the third executable portion is configured to automatically select portions of the connectivity data by being configured to:

for an initial component in the subset of components, identify another component connected to the initial component based upon the connectivity data;

add the other component to the subset of components; and repeat the identification and addition with the other component being the initial component; and a fourth executable portion configured to generate a display of a diagram based upon the automatically selected portions of the connectivity data of only the subset of components without other components from the plurality of components that are not included in the subset of components.

37. The computer program product of claim 36, wherein said first executable portion is also capable of receiving a request for the subset of components that connect at least two other components, and wherein said third executable portion is also capable of automatically selecting portions of the connectivity data that create at least one path between the at least two other components.

38. The computer program product of claim 36, wherein said first executable portion is also capable of receiving a request for the subset of components that connect a source component to a sink component, and wherein said third executable portion is also capable of automatically selecting portions of the connectivity data that create at least one path between the source component and the sink component.

39. The computer program product of claim 36, wherein said first executable portion is also capable of receiving a request for the subset of components that connect a respective component to at least one of a source component and a sink component, and wherein said third executable portion is also capable of automatically selecting portions of the connectivity data that create at least one path between the respective component and at least one of the source component and the sink component.

40. The computer program product of claim 36, wherein said first executable portion is also capable of receiving a request for the subset of components that comprises at least one of an Airline Transport Association (ATA) system and a Unified Numbering System (UNS), and wherein said third executable portion is also capable of automatically selecting portions of the connectivity data that include the components of the at least one of the ATA system and the UNS and that create at least one path among the components of the at least one of the ATA system and the UNS.

41. The computer program product of claim 36, wherein said first executable portion is also capable of receiving a request for the subset of components that comprises at least one figure-sheet set specification, and wherein said third executable portion is also capable of automatically selecting portions of the connectivity data that include the components of the at least one figure sheet set specification and that create at least one path among the components of the at least one figure sheet set specification.

42. The computer program product of claim 36, wherein said third executable portion is further capable of removing at least one component from the automatically selected portions of the connectivity data that satisfy the request for the subset of components and directly connecting the components that attach to a removed component.

43. The computer program product of claim 36, wherein said first executable portion is also capable of receiving a request for the subset of components that comprises at least one of a maximum number of components and a maximum number of connections, and wherein said third executable portion is also capable of automatically selecting portions of the connectivity data that satisfy the at least one requested maximum number of components and maximum number of connection paths.

44. The computer program product of claim 36, wherein said first executable portion is also capable of receiving a request for the subset of components that comprise a path that is located a predefined distance away from a respective component, and wherein said third executable portion is also capable of automatically selecting portions of the connectivity data that include the path that is located the predefined distance away from the respective component.

45. The computer program product of claim 36, wherein said third executable portion comprises said fourth executable portion.

46. The computer program product of claim 36, wherein said third executable portion is further capable of adding at least one component to the subset of components after the diagram of the subset of components is generated and said fourth executable portion is also capable of re-generating a diagram of the subset of components including the at least one added component.

47. The computer program product of claim 36, wherein said third executable portion is further capable of removing at least one component from the subset of components after the diagram of the subset of components is generated and said fourth executable portion is also capable of re-generating a diagram of the subset of components without the at least one removed component.

48. The computer program product of claim 36, wherein said first executable portion is also capable of receiving a request for the subset of components included in a repair log, and wherein said third executable portion is also capable of automatically selecting portions of the connectivity data that include the components included in the repair log.

49. The computer program product of claim 48, wherein said third executable portion is further capable of automatically selecting portions of the connectivity data that create at least one path among the components included in the repair log.

50. The computer program product of claim 36, wherein said first executable portion is also capable of receiving a request for the subset of components included in a maintenance procedure, and wherein said third executable portion is also capable of automatically selecting portions of the connectivity data that include the components included in the maintenance procedure.

51. The computer program product of claim 50, wherein said third executable portion is further capable of automatically selecting portions of the connectivity data that create at least one path among the components included in the maintenance procedure.

52. The computer program product of claim 36 wherein the third executable portion is further configured to terminate the repeating upon satisfying a predefined condition.

* * * * *